United States Patent [19]

Igaki et al.

[11] Patent Number: 5,176,376
[45] Date of Patent: Jan. 5, 1993

[54] VIBRATION SHEET FEEDER

[75] Inventors: Masahiko Igaki, Tokyo; Yoshifumi Nishimoto; Kenichi Kataoka, both of Yokohama; Koji Kitani, Kawasaki; Hiroyuki Seki, Urawa; Eiichi Yanagi, Inagi, all of Japan

[73] Assignee: Canon Kabushiki Kaisha, Tokyo, Japan

[21] Appl. No.: 752,965

[22] Filed: Aug. 29, 1991

Related U.S. Application Data

[63] Continuation of Ser. No. 476,249, Feb. 7, 1990, abandoned.

[30] Foreign Application Priority Data

Feb. 10, 1989 [JP] Japan .................. 1-31355

[51] Int. Cl.$^5$ .............................................. B65H 5/00
[52] U.S. Cl. ........................... 271/267; 271/8.1; 310/323
[58] Field of Search ............ 198/630; 271/8.1, 84, 271/193, 264, 267, 278, 306; 310/323

[56] References Cited

U.S. PATENT DOCUMENTS

| | | | |
|---|---|---|---|
| 4,672,256 | 6/1987 | Okuno et al. | 310/323 |
| 4,692,650 | 9/1987 | Okumura et al. | 310/323 |
| 4,692,651 | 9/1987 | Hiramatsu et al. | 310/323 |
| 4,692,652 | 9/1987 | Seki et al. | 310/323 |
| 4,752,711 | 6/1988 | Tsukimoto et al. | 310/323 |
| 4,763,776 | 8/1988 | Okumura et al. | 198/630 |
| 4,912,351 | 3/1990 | Takata et al. | 310/323 |
| 4,995,598 | 9/1990 | Hiroshige et al. | 271/267 |
| 4,997,177 | 3/1991 | Mori et al. | 271/267 |
| 5,062,622 | 11/1991 | Kataoka et al. | 271/267 |
| 5,065,999 | 11/1991 | Kataoka et al. | 271/267 |

FOREIGN PATENT DOCUMENTS

| | | | |
|---|---|---|---|
| 3312037 | 2/1984 | Fed. Rep. of Germany. | |
| 177243 | 6/1984 | Japan | 271/264 |
| 2636 | 1/1986 | Japan | 271/306 |
| 86333 | 5/1986 | Japan | 271/193 |
| 124412 | 6/1986 | Japan | 198/630 |
| 60532 | 3/1989 | Japan | 271/278 |
| 129784 | 5/1989 | Japan | 310/323 |
| 818989 | 4/1981 | U.S.S.R. | 198/630 |
| 1364390 | 8/1974 | United Kingdom. | |
| 1394738 | 5/1975 | United Kingdom. | |

Primary Examiner—D. Glenn Dayoan
Assistant Examiner—Steven M. Reiss
Attorney, Agent, or Firm—Fitzpatrick, Cella, Harper & Scinto

[57] ABSTRACT

Disclosed is feeding apparatus comprising a first vibration apparatus having projections provided with a predetermined distance therebetween, the first vibration apparatus producing a first travelling vibration wave in response to an electrical signal applied thereto, and a second vibration apparatus having projections located at the positions substantially corresponding to the projections of the first vibration apparatus, the second vibration apparatus producing a second travelling vibration wave proceeding in the same direction as the first travelling vibration wave in response to an electrical signal supplied thereto thereby the sheet inserted between the projections of the first vibration apparatus and the projections of the second vibration apparatus being fed by the first and second travelling vibration waves.

14 Claims, 2 Drawing Sheets

VIBRATION SHEET FEEDER

This application is a continuation of application Ser. No. 476,249, filed Feb. 7, 1990, now abandoned.

BACKGROUND OF THE INVENTION

1. Field of the Invention

The present invention relates to a sheet feeder useful for various apparatus provided with a mechanism for feeding a sheet such as computer, copier, printer, facsimile equipment, word processor, typewriter etc.

2. Related Background Art

In the conventional sheet feeding mechanism used in the above-mentioned apparatus, a rotating driving source such as a motor has been used to drive rubber rollers, belts or the like by which the feeding of sheet is effected.

Another type of sheet feeding system known in the art is a vibration type of sheet feeding system as disclosed, for example, in Japanese Patent Application Laid-Open No. 59-177,243. In this sheet feeding system, a pair of elastic members are used to generate travelling vibration waves therein The elastic members are in pressure-contact with a sheet to be fed and apply to the sheet a feeding force derived from the travelling waves produced in the elastic members FIG. 3 illustrates the principle of operation of the sheet feeding system as disclosed in the Japanese Patent Publication. The reference characters 11 and 12 in FIG. 3 denote a pair of elastic members in which travelling bending vibrations are produced as shown in the figure. A sheet 13 is sandwiched in the elastic members 11 and 12. A phase difference is set between the bending vibrations on the elastic members 11 and 12, whose phase difference is 180° spacially. Therefore, the bending vibrations travel in such a manner that the convex portion, on the sheet side, of the bending of the elastic member 11 is always opposed to the convex portion, on the sheet side, of the bending of the elastic member 12. If a certain point on the elastic member is particularly examined at the time, it will be shown that the point moves describing an elliptic locus as indicated by two arrows in FIG. 3. Regarding the elastic member 11, when the bending vibration on it travels rightwardly, the point moves clockwisely describing an elliptic locus as shown in FIG. 3. Consequently, the direction of the movement of the point on the elastic member 11 is opposite to the travelling direction of the vibration. The same is applicable to the movement of a point on the other elastic member 12. From these movements of the points on both of the elastic members 11 and 12, there is produced a force for feeding the sheet 13. As indicated by an arrow, the direction of the sheet feeding is, therefore, opposite to the travelling direction of the bending vibration.

FIG. 4 is a perspective view of an example of the apparatus in which a sheet feeding force is produced in accordance with the principle described above.

Again, the reference characters 11 and 12 denote elastic members and 13 denotes a sheet to be fed. 14-1, 14-2, 15-1 (not shown) and 15-2 denote vibration members, 16 a pressing and supporting member, 17-1 and 17-2 side support plates and 18 a bottom plate.

The elastic member 12 is supported on the bottom plate 18 and the elastic member 11 is supported by the pressing and supporting member 16. The member 16 possesses some elasticity with which the sheet 13 is pressed against the lower elastic member 12 through the upper elastic member 11. In this manner, the elastic members 11 and 12 hold the sheet sandwiched in between them. In the manner described above, the elastic members 11 and 12 are brought into bending vibration. At the time, the convex portion of bending of the elastic member 11 is substantially opposed to the convex portion of the bending of the elastic member 12. As a result of it, there is produced a sheet feeding which can move the sheet 13 in a direction indicated by the arrow in FIG. 4. The arrow is shown as a double arrow which means that the direction of sheet feeding is reversible by changing over the travelling direction of the vibration.

The sheet feeding system as shown in FIGS. 3 and 4 has, however, some problems to be solved.

Although not shown in FIGS. 3 and 4, the vibration type of sheet feeder according to the prior art has generally a plurality of grooves and vibrating elements provided on the elastic members (vibration members) in order to lower the neutral plane of the thickness thereby achieving the desired effect of vibration. When a sheet is held and moved between such elastic members provided with a plurality of grooves and vibrating elements, the following problems arise:

(1) Thrust and speed obtainable for sheet feeding are not stable but variable depending upon the accuracy of alignment of two elastic members, especially alignment of the vibrating elements on one elastic member with the vibrating elements on the other elastic members. Because of it, the thrust and speed may be so dropped down that the desired efficiency of sheet feeding can not be obtained.

(2) Thrust and speed obtainable for sheet feeding are not stable but variable also depending upon the correspondence in phase of the travelling waves produced on two discrete elastic members. If the phase of the travelling wave produced on one elastic element does not correctly correspond to the phase of the travelling wave produced on the other elastic element, the thrust and feeding speed may be so dropped down that the desired efficiency of sheet feeding is no longer attainable.

SUMMARY OF THE INVENTION

Accordingly, the primary object of the present invention is to solve the problems involved in the prior art apparatus as mentioned above, and to provide a sheet feeder with which the performance of sheet feeding can be improved.

More specifically, the object of the present invention is to provide a sheet feeder comprising a pair of elastic members having vibrating elements arranged on both of the elastic members and a sheet feeding means, which is characterized in that the vibrating elements on one of the elastic members and on the other elastic member are arranged so aligned with each other that the vibrating elements on the one elastic member are opposed to the vibrating elements on the other elastic member with a sheet being sandwiched in between them and that said sheet feeding means includes a travelling wave controlling means for controlling the phase relationship between the travelling wave produced in the one elastic member and the travelling wave produced in the other elastic member in such manner that the peak of the former travelling wave and the peak of the latter travelling wave coincide with each other.

Other objects, features and advantages of the present invention will appear more clearly from the following

DESCRIPTION OF THE PREFERRED EMBODIMENTS

Figure 1:
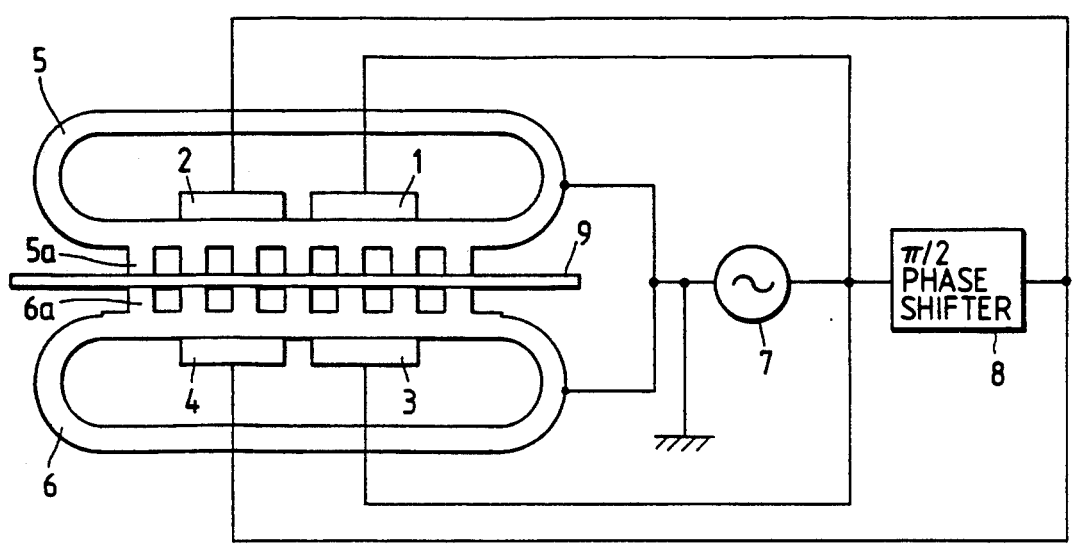
FIG. 1 is a side view of an embodiment of the present invention.

Referring first FIG. 1 showing a first embodiment of the present invention, the sheet feeder comprises vibration members 1, 2, 3 and 4, elastic members 5 and 6, an oscillator 7 and a $\pi/2$ phase shifter. Designated by 9 is a sheet to be fed. Each of the vibration members is composed of a piezo-electric element. A cyclic voltage is applied to the vibration members 1 to 4 by the oscillator 7.

As seen in FIG. 1, the vibration members 1 and 2 are bonded to the elastic member 5 by means of adhesive or the like and the vibration members 3 and 4 are bonded to the elastic member 6. In this embodiment, the elastic members 5 and 6 are conductive members connected to a grounding circuit. The vibration members 1 and 3 receive the cyclic voltage directly from the oscillator 7, whereas the vibration members 2 and 4 receives a $\pi/2$ phase-shifted cyclic voltage through the $\pi/2$ phase shifter. All of the cyclic voltages applied to the vibration members 1, 2, 3 and 4 have the same effective value.

When the cyclic voltage is applied, the vibration members 1, 2, 3 and 4 vibrate, which in turn brings the elastic members 5 and 6 into vibration. The vibration member 1 is spaced from the vibration member 2 by a distance of $(n+\frac{1}{4})\lambda$ wavelength where n is a natural number. Also, the vibration member 3 is spaced from the vibration member 4 by the same distance.

As a result of the spaced arrangement of these vibration members, there is produced from the vibration a travelling wave on each of the elastic members 5 and 6. More specifically, the bending vibration of each the elastic member transforms into a travelling wave. As previously mentioned, an analysis of the travelling wave teaches us that every point on the surface of the vibrating elastic member moves describing an elliptic locus. The outside portion of the bending has, therefore, a velocity component the direction of which is always opposite to the travelling direction of the produced travelling wave. Since the sheet 9 is always in contact with the outside portion of the bending, the sheet 9 is moved in the direction opposite to the travelling direction of the travelling wave.

Referring again to FIG. 1, the elastic member 5 has a row of vibrating elements 5a projecting out in the direction perpendicular to the travelling direction of the travelling wave. Similarly, the elastic member 6 has a row of vibrating elements 6a facing the row of vibrating elements 5a on the elastic element 5. These vibrating elements serve to lower the neutral plane of the thickness of the elastic members thereby producing the desired vibration magnification effect. The sheet 9 comes into contact with the projected ends of the vibrating elements 5A, 6A arranged in face-to-face relation. Thus, the projected vibrating elements 5a and 6a on the elastic members 5 and 6 are arranged aligned with each other.

In this embodiment, the vibrations members 1 to 4 are arranged in such manner that the vibration members 1 and 2 on the elastic member 5 are symmetric to the vibration members 3 and 4 on the elastic member 6 relative to the plane of the sheet 9.

With the above-described arrangement, the feeding force and feeding speed of the sheet do not decrease because the peaks of each travelling vibration wave correspond with each other, in other words, a peak point of a travelling wave does not fall into a bottom point of another travelling wave. Further, it should be noted that the peaks of each wave do not necessarily exactly correspond with each other and it would be allowed if there is a slight deviation between them.

Figure 2A:
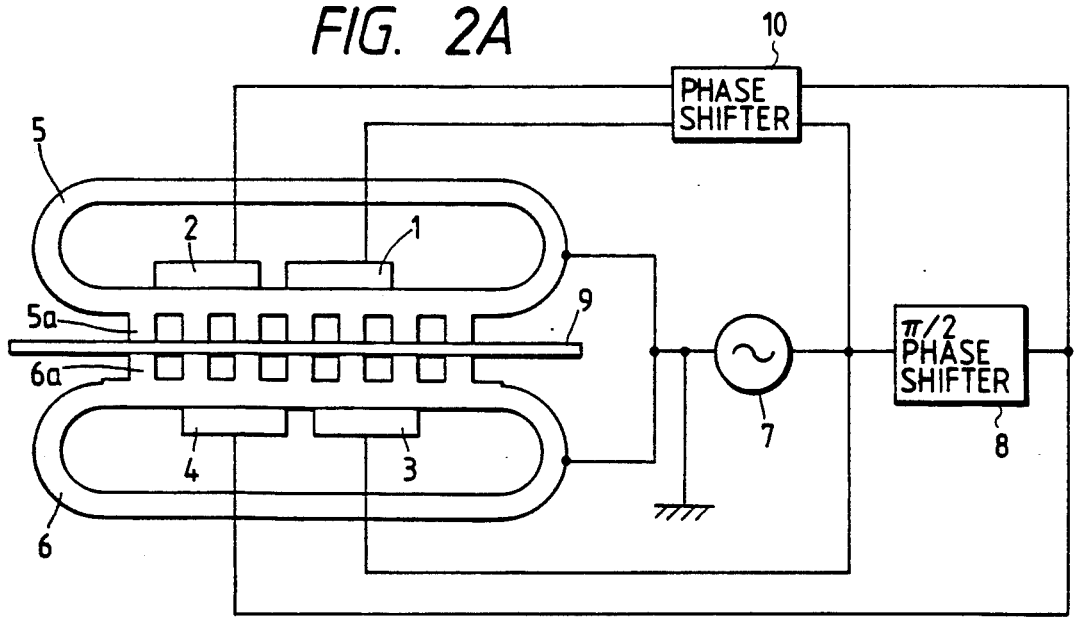
FIG. 2A is a side view of a second embodiment of the invention.
Figure 2B:
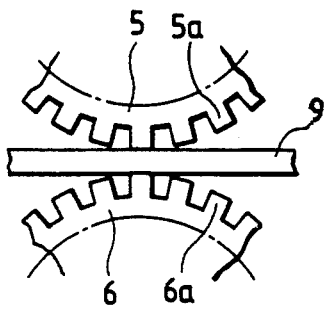
FIG. 2B is a partial enlarged view of elastic member in the embodiment of FIGS. 1 and 2A when the sheet is being fed.
Figure 3:
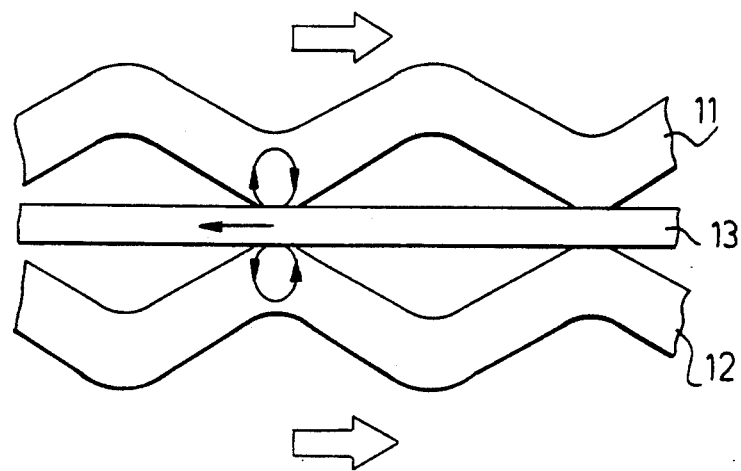
FIG. 3 is a schematic view illustrating the principle of the vibration type of sheet feeding system to which the present invention is pertinent.
Figure 4:
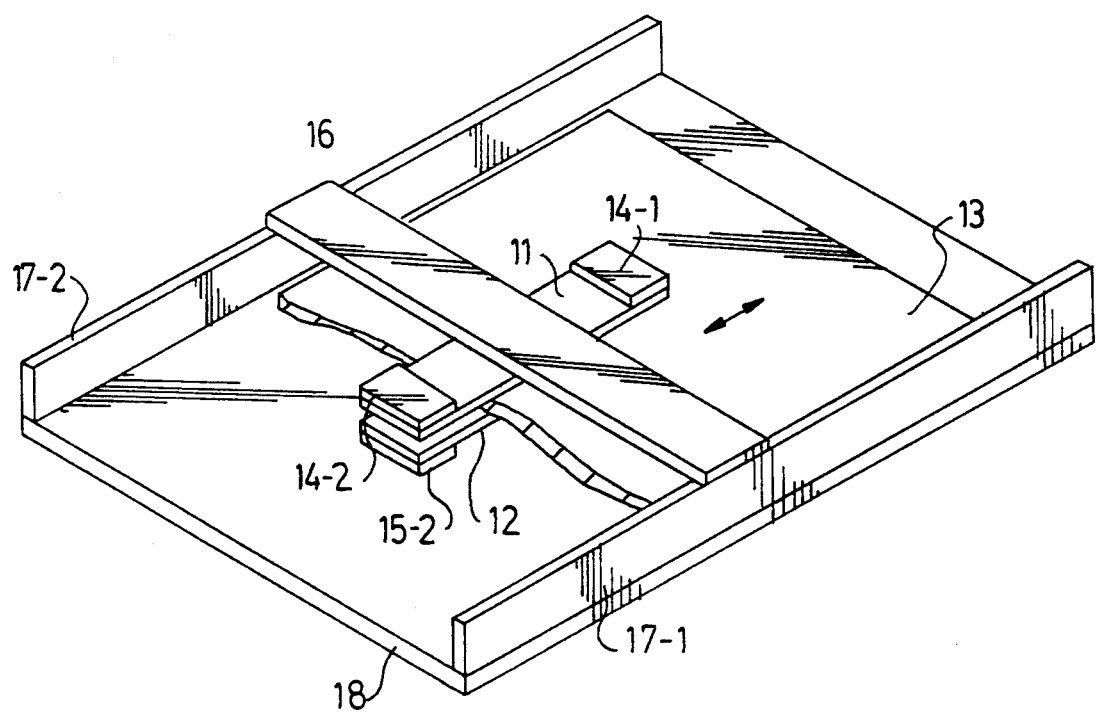
FIG. 4 is a perspective view of an example of the prior art vibration type sheet feeder.

FIG. 2 shows a second embodiment of the invention. The same characters to FIG. 1 represent the same or corresponding members and elements.

In the second embodiment, the vibration members 1 and 2 on the elastic element 5 are positionally not symmetric to the vibration members 3 and 4 relative to the plane of the sheet 9. The vibration members 3 and 4 are arranged in positions shifted from the positions of the vibration members 1 and 2. However, the phase of the cyclic voltage applied to the vibration members 1 and 2 can be shifted relative to that of cyclic voltage applied to the vibration members 3 and 4 by means of a phase shifter 10. Therefore, by suitably controlling the phase shift, man can adjust the travelling waves produced on the elastic members 5 and 6 in such manner that the peaks of the travelling waves coincide with each other.

According to present invention, the projected ends of each vibration member (elastic member) pinching the sheet are respectively faced with each other, or the phase relation of the travelling vibration waves generated in the respective vibration member is controlled, in other words the wave length and speed of the respective vibration wave is controlled so as to correspond with each other, so that the peaks of each wave correspond with each other. Thus arrangement can improve the efficiency of sheet feeding magnificiently (cf. FIG. 2B).

What is claimed is:

1. A sheet feeding apparatus, comprising:
   (a) first vibration means having projections provided with a predetermined distance therebetween, said first vibration means producing a first travelling vibration wave in response to an electrical signal applied thereto;
   (b) second vibration means having projections located at positions substantially corresponding to the projections of said first vibration means, said second vibration means producing a second travelling vibration wave proceeding in the same direction as said first travelling vibration wave in response to an electrical signal supplied thereto thereby the sheet inserted between the projections of said first vibration means and the projections of said second vibration means being fed by said first and second travelling vibration waves.

2. A feeding apparatus according to claim 1, wherein; said first vibration means is a loop-shaped member.

3. A feeding apparatus according to claim 1, wherein;

said second vibration means is a loop-shaped member.

4. A feeding apparatus according to claim 2, wherein;
said projections of said first vibration member is provided at a linear portion of said loop-shaped member.

5. A feeding apparatus according to claim 3, wherein;
said projections of said second vibration means is provided at a linear portion of said loop-shaped member.

6. A feeding apparatus according to claim 1, wherein the sheet frictionally engages with both the projections of said first vibration means and the projections of said second vibration means.

7. A feeding apparatus according to claim 1, wherein;
the portion of the projections of said first vibration means engaging the sheet has a flat shape.

8. A feeding apparatus according to claim 7, wherein;
the portion of the projections of said second vibration means engaging the sheet has a flat shape.

9. A sheet feeding apparatus, comprising:
(a) first vibration means having a projection formed by grooves, said first vibration means producing a first travelling vibration wave in response to an electrical signal supplied thereto; and
(b) second vibration means having a projection formed by groves located at a position corresponding to the projection of said first vibration means, and second vibration means producing a second travelling vibration wave proceeding in the same direction as the first travelling vibration wave in response to an electrical signal supplied thereto, whereby the sheet inserted between the projection of said first vibration member and the projection of said second vibration member is fed by the first and second travelling vibration waves.

10. A sheet feeding apparatus according to claim 9, wherein;
said first vibration means is an elliptical shaped member.

11. A sheet feeding apparatus according to claim 9, wherein;
said second vibration means is an elliptical shaped member.

12. A sheet feeding apparatus, comprising:
(a) first vibration means having a projection formed by grooves, said first vibration means producing a first travelling vibration wave in response to an electrical signal supplied thereto;
(b) second vibration means having a projection formed by grooves provided at a portion across the sheet from said projection of said first vibration means, said second vibration means generating a second travelling vibration wave proceeding in the same direction as said first travelling vibration wave in response to an electrical signal supplied thereto; and
(c) means for substantially making a peak of the first travelling vibration wave and a peak of the second travelling vibration wave correspond with each other, whereby the sheet inserted between the projection of the first vibration means and the projection of the second vibration means is fed by the first and the second travelling vibration waves.

13. A sheet feeding apparatus, comprising:
(a) first vibration means having projections, said first vibration means producing a first vibration in response to an electrical signal supplied thereto; and
(b) second vibration means having projections located at positions corresponding to the projections of said first vibration means, said second vibration means producing a second vibration proceeding in the same direction as the first vibration in response to an electrical signal supplied thereto, whereby the sheet inserted between the projections of said first vibration member and the projections of said second vibration member is fed by the first and second vibrations.

14. A sheet feeding apparatus, comprising:
(a) first vibration means having projections, said first vibration means producing a first vibration in response to an electrical signal supplied thereto;
(b) second vibration means having projections provided at a portion across the sheet from said projections of said first vibration means, said second vibration means generating a second vibration proceeding in the same direction as the first vibration in response to an electrical signal supplied thereto; and
(c) means for substantially making a peak of the first vibration and a peak of the second vibration correspond with each other, whereby the sheet inserted between the projections of said first vibration means and the projections of said second vibration means is fed by the first and the second vibrations.

* * * * *

UNITED STATES PATENT AND TRADEMARK OFFICE
CERTIFICATE OF CORRECTION

PATENT NO. : 5,176,376
DATED : January 5, 1993
INVENTOR(S) : IGAKI et al.

It is certified that error appears in the above-identified patent and that said Letters Patent is hereby corrected as shown below:

COLUMN 1

Line 24, "therein" should read --therein.--.

COLUMN 3

Line 20, "first Fig. 1" should read --first to Fig. 1--.
Line 35, "receives" should read --receive--.
Line 49, "the" (second occurrence) should be deleted.

COLUMN 4

Line 7, "vibrations" should read --vibration--.
Line 37, "present" should read --the present--.
Line 42, "words the" should read --words, the--.
Line 54, "thereto;" should read --thereto; and--.

Signed and Sealed this

Twenty-third Day of November, 1993

Attest:

BRUCE LEHMAN

Attesting Officer   Commissioner of Patents and Trademarks